United States Patent
Pai et al.

(10) Patent No.: US 7,889,206 B2
(45) Date of Patent: Feb. 15, 2011

(54) DIRECT MEMORY ACCESSING FOR FETCHING MACROBLOCKS

(75) Inventors: R. Lakshmikanth Pai, Bangalore (IN); Ravindra Bidnur, Bangalore (IN); Sandeep Bhatia, Bangalore (IN); Lakshmanan Ramakrishnan, Bangalore (IN); Vijayanand Aralaguppe, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 296 days.

(21) Appl. No.: 10/463,170

(22) Filed: Jun. 16, 2003

(65) Prior Publication Data

US 2004/0255059 A1 Dec. 16, 2004

(51) Int. Cl.
*G06F 12/00* (2006.01)
*G06F 12/02* (2006.01)
*G09G 5/37* (2006.01)

(52) U.S. Cl. .......................... 345/564; 345/563; 345/565

(58) Field of Classification Search .................. 345/564, 345/555, 565, 563, 530
See application file for complete search history.

(56) References Cited

U.S. PATENT DOCUMENTS

| | | | | |
|---|---|---|---|---|
| 4,700,182 A | * | 10/1987 | Ohgami | 345/565 |
| 6,084,600 A | * | 7/2000 | Munshi | 345/545 |
| 6,144,323 A | * | 11/2000 | Wise | 341/76 |
| 6,223,268 B1 | * | 4/2001 | Paluch et al. | 711/201 |
| 6,393,153 B2 | * | 5/2002 | Ozaki | 382/233 |
| 6,750,871 B2 | * | 6/2004 | Nishikawa | 345/544 |
| 6,842,219 B2 | * | 1/2005 | Lee | 352/244 |

* cited by examiner

*Primary Examiner*—Joni Hsu
(74) *Attorney, Agent, or Firm*—McAndrews, Held & Malloy, Ltd.

(57) ABSTRACT

Presented herein are a system, method, and apparatus for retrieving an object from memory. The object can be stored in a manner, such that the first byte of the object and the last byte of the object are in the middle of the memory data words. The object is retrieved by a direct memory access controller. The direct memory access controller, when provided with a read transaction with the starting address and the ending address of the object, retrieves the data words storing the object, and overwrites the portions of the data word that precede and follow the object.

20 Claims, 6 Drawing Sheets

DIRECT MEMORY ACCESSING FOR FETCHING MACROBLOCKS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Memory modules comprise any number of data words for storage of data. The data words typically comprise a plurality of bytes. For example, gigantic data words comprise 16 bytes. The memory is typically accessible in data word units. The contents of the memory are accessed by either a read or write to one or more complete data words.

Objects, such as data structures, are stored in memory. Although many objects comprise a whole number of bytes, many objects do no necessarily comprise a whole number of data words. The foregoing can occur for several reasons. In some cases, the objects require considerably less bytes than a single data word. Additionally, objects can be transported from one type of memory to another type of memory. While the object may comprise a whole number of the data words in the former type of memory, the object may not comprise a whole number of data words in the latter type of memory. It is, therefore, possible for an object to both start and end in the middle of a data word, in contrast to starting at the start of a data word and ending at the end of a data word.

For example, objects can comprise data structures for compressing video data. Video compression standards such as MPEG-2 use data structures, such as macroblocks, for compressing video data. During the decoding of compressed video data, a video decoder retrieves macroblocks from memory for decoding.

As noted above, the memory is accessible in data word units. In order to retrieve an object from memory, the data words storing the objects are retrieved. However, unless the objects start at the beginning of a data word and ends at the ending of a data word, retrieving the data words storing the object will include bytes that are not part of the object. Retrieving bytes that are not part of the objects can result in erroneous results from processing the objects.

In some cases, the foregoing is alleviated by starting all objects at the start of a data word. Where a an object is stored in a non-round number of data words, the remainder portion of the data words is padded with a pattern such as all zeroes. However, the foregoing represents inefficient memory usage, particularly in cases where the memory comprises large data words, such as gigantic data words.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein are a system, method, and apparatus for accessing objects stored in a memory. In one embodiment, objects are retrieved from memory by retrieving one or more data words, where each of the data words comprise a plurality of bytes and the object stored starts at a starting byte in a particular one of the data words and ending at an ending byte in another particular one of the data words; and overwriting a first one or more bytes and a second one or more bytes, the first one or more bytes before the starting byte, and the second one or more bytes after the ending byte.

In another embodiment, there is disclosed a system for retrieving an object from memory. The system includes memory and a direct memory access controller. The memory stores the object, and comprises a plurality of data words. Each of the data words comprises a plurality of bytes, and the object stored starts at a starting byte in a first one of the data words and ends at an ending byte in a second particular one of the data words. The direct memory access controller retrieves the first one of the data words and the second one of the data words, and overwrites a first one or more bytes and a second one or more bytes, the first one or more bytes before the starting byte, and the second one or more bytes after the ending byte.

In another embodiment, there is disclosed a circuit for retrieving an object from memory. The circuit includes memory and a direct memory access controller connected to the memory. The memory comprises a plurality of data words. Each of the data words comprising a plurality of bytes, and the object stored starts at a starting byte in a first one of the data words and ends at an ending byte in a second particular one of the data words. The direct memory access controller is operably capable of retrieving the first one of the data words and the second one of the data words, and of overwriting a first one or more bytes and a second one or more bytes, the first one or more bytes before the starting byte, and the second one or more bytes after the ending byte.

These and other advantages and novel features of the present invention, as well as details of an illustrated embodiment thereof, will be more fully understood from the following description and drawings.

DETAILED DESCRIPTION OF THE INVENTION

Figure 1:
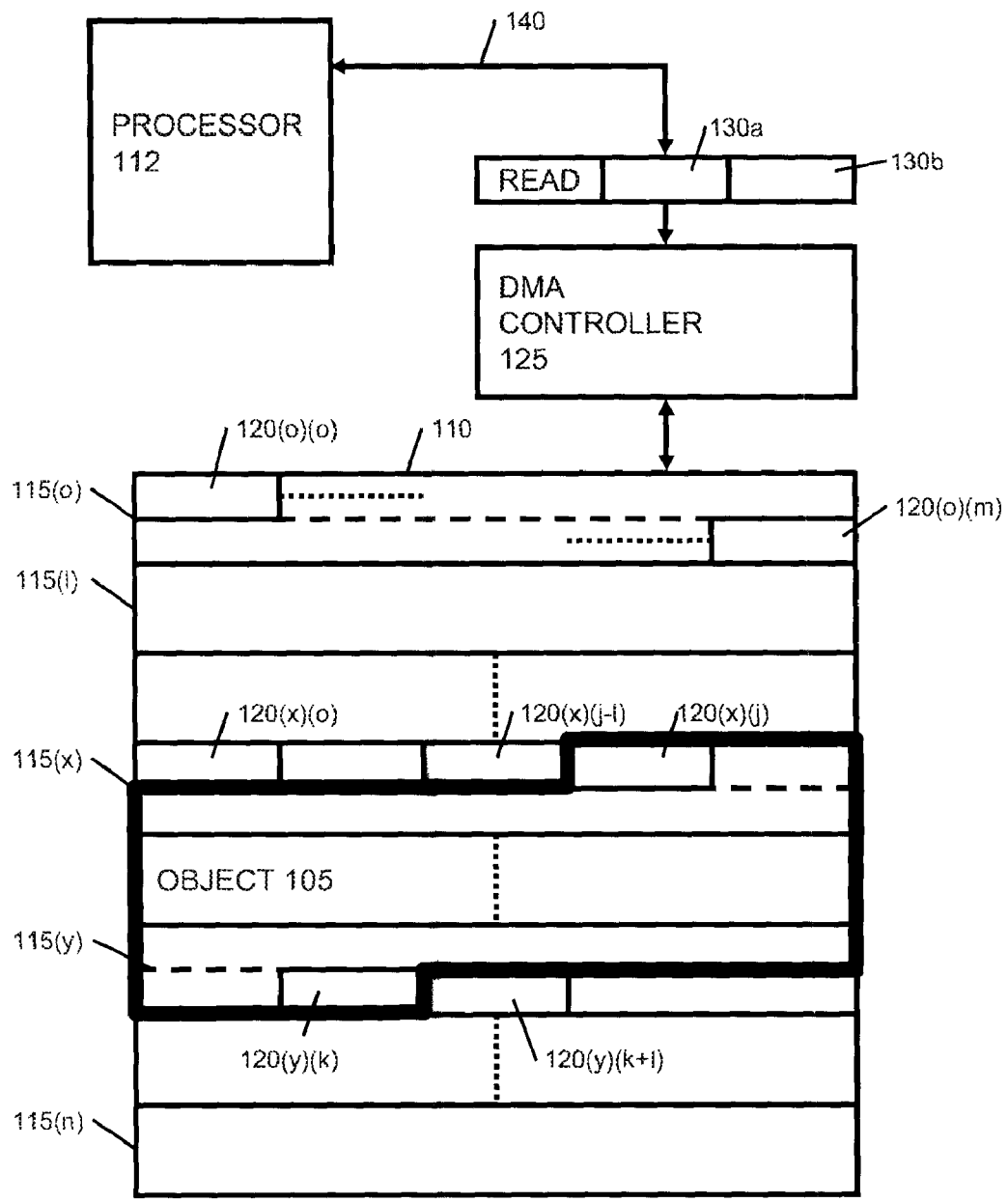
FIG. 1 is a block diagram describing a system for retrieving objects stored in a memory in accordance with an embodiment of the present invention.

Referring now to FIG. 1, there is illustrated a block diagram describing an exemplary system for retrieving an object 105 stored in a memory 110 by a processor 112. The memory 110 comprises any number of data words 115(0) . . . 115(n). Each data words 115(0) . . . 115(n) comprises a plurality of bytes 120(0)(0) . . . 120(n)(m). For example, a word type known as a gigantic word comprises 16 bytes, or 128 bits.

Each data word 115 and byte 120 is associated with a particular address. The address of the first byte 120(0)(0) . . . 120(*n*)(0) of a data word 115(0) . . . 115(*n*) coincides with the address of the data word.

The data words 115(0) . . . 115(*n*) are the fundamental storage units within the memory 110. The memory 110 is accessible on a data word 115 by data word basis. Contents form the memory 110 can be selectively accessed, by accessing a contiguous range of memory locations beginning at the start of a data word 115 and terminating at the end of a data word 115.

Access to the memory 110 is provided and controlled by a direct memory access (DMA) controller 125. When the processor 112 seeks to access data from the memory 110, the processor 112 provides the DMA controller 125 with a starting address 130*a* and an ending address 130*b*. Responsive thereto, the DMA controller 125 provides the data word 115 (*x*) and the each data word 115(*x*+1) . . . 115(*y*−1), thereafter until the data word 115(*y*) at the ending address 130*b*.

As noted above, the data words 115 contain a plurality of bytes. Although many objects 105 are stored as a whole number of bytes 120, the objects 105 do not necessarily require a whole number of data words 115 for storage. Therefore, the objects 105 can be stored in a range of continuous bytes 120 that begin and end in the middle of a data word 115.

The processor 112 can retrieve the object 105 from the memory 110 by issuing a read command with a start address and an end address. The start address is the address of the first byte 120 where the object 105 is stored, e.g., 120(*x*)(*j*), and the end address is the address of the last byte 120 wherein the object is stored, e.g., 120(*y*)(*k*).

As noted above, portions of the memory 110 can be accessed starting from the beginning of a data word 115(*x*) and terminated at the end of a data word 115(*y*). Accordingly, in order to retrieve an object 105 stored from bytes 120(*x*)(*j*) . . . 120(*y*)(*k*), the data words 115(*x*) . . . 115(*y*) are retrieved from the memory 110. However, although the data words 115(*x*) . . . 115(*y*) include the bytes 120(*x*)(*j*) . . . 120(*y*) (*k*), the data words 115(*x*) . . . 115(*y*) also include the bytes 120(*x*)(0) . . . 120(*x*)(*j*−1), and bytes 120(*y*)(*k*+1) . . . 120(*y*) (*m*) that are not part of the object 105. Providing the bytes 120(*x*)(0) . . . 120(*x*)(*j*−1), and bytes 120(*y*)(0) . . . 120(*y*)(*k*−1) that are not part of the object 105 can result in erroneous operation by the processor 112.

To avoid the foregoing erroneous operation, the processor 112 issues a request to read, with the start address of the object 105, byte 120(*x*)(*j*) and the end address of the object 105, byte 120(*y*)(*k*) to the DMA controller 125. The DMA controller 125 retrieves the data words 115(*x*) . . . 115(*y*) that include the bytes 120(*x*)(*j*) . . . 120(*y*)(*k*) starting at the start address through the end address. The DMA controller 125 can determine the data words 115(*x*) . . . 115(*y*) that include the bytes 120(*x*)(*j*) . . . 120(*y*)(*k*) in one of several ways. In one embodiment, the number of bytes in a data word 115(*x*) . . . 115(*y*) are an integer power of two, such as 2, 4, 8, 16, etc. Accordingly, the address of the data word 115 comprising a byte 120 can be determined by truncating a predetermined number of least significant bits of the byte address. Where the number of bytes 120 per data word are not an integer power of two, the data words 115 can be determined by performing a simple arithmetic operations.

As noted, retrieving of the data words 115(*x*) . . . 115(*y*) also includes retrieving the bytes 120(*x*)(0) . . . 120(*x*)(*j*−1), and bytes 120(*y*)(*k*+1) . . . 120(*y*)(*m*). The DMA controller 125 overwrites the data from the bytes 120(*x*)(0) . . . 120(*x*) (*j*−1), and bytes 120(*y*)(*k*+1) . . . 120(*y*)(*m*) with a pattern. The pattern can comprise all 0's or another pattern indicative of null information.

The DMA controller 125 provides the contents of the bytes 120(*x*)(*j*) . . . 120(*y*)(*k*) starting at the start address through the end address, prepended with the pattern that overwrites the bytes 120(*x*)(0) . . . 120(*x*)(*j*−1) and appended with the pattern that overwrites bytes 120(*y*)(*k*+1) . . . 120(*y*)(*m*), to the processor 112 via a bus 140.

Figure 2:
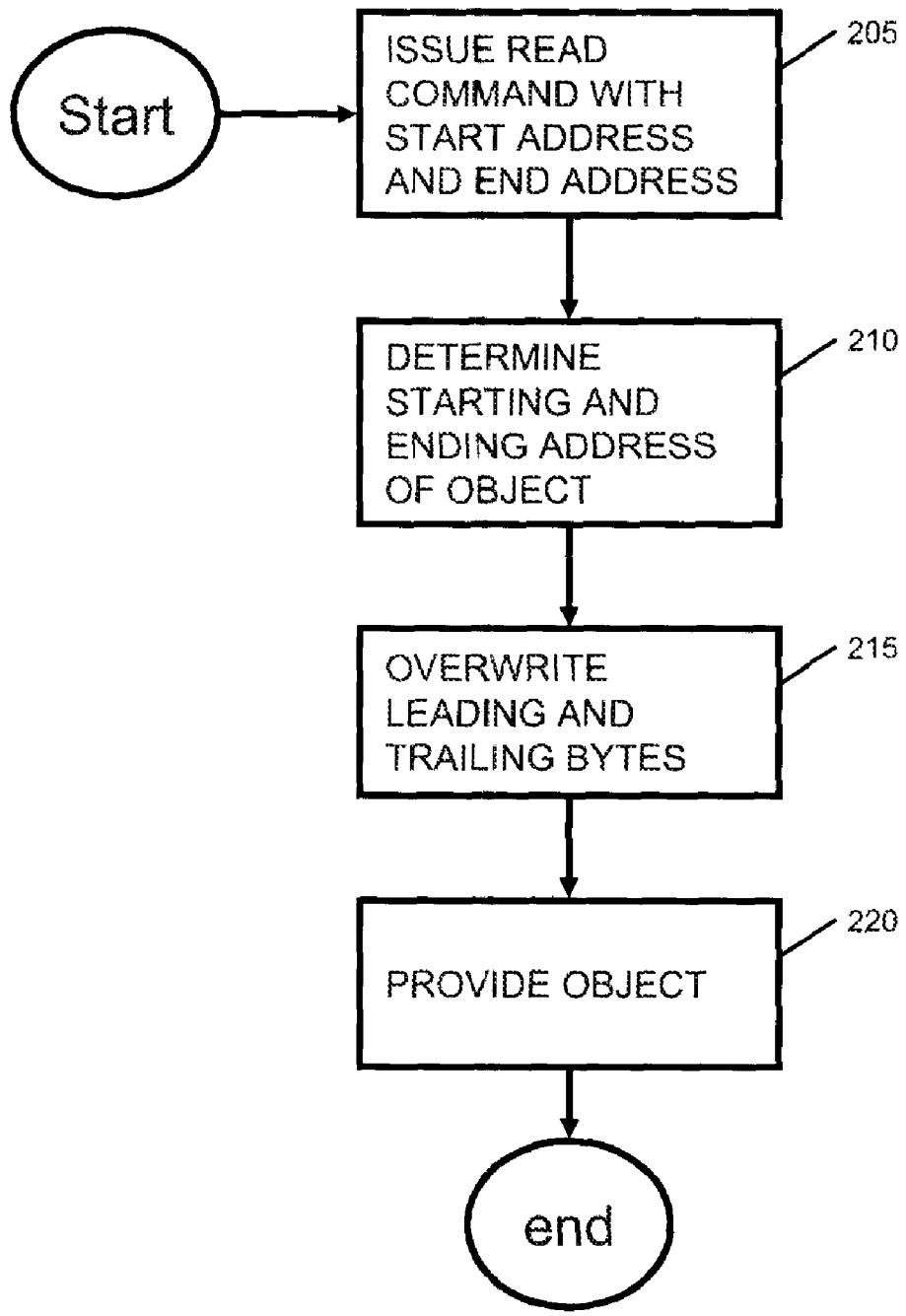
FIG. 2 is a flow diagram for retrieving objects stored in a memory in accordance with an embodiment of the present invention.

Referring now to FIG. 2, there is illustrated a flow diagram for retrieving an object 105 stored in memory 110. At 205, the processor 112 issues a read command with the start address of the object 105, byte 120(*x*)(*j*) and the end address of the object 105, byte 120(*y*)(*k*) to the DMA controller 125 via bus 140. Responsive thereto, the DMA controller 125 determines and retrieves (210) the data words 115(*x*) . . . 115(*y*) that include the bytes 120(*x*)(*j*) . . . 120(*y*)(*k*) starting at the start address through the end address. As noted, retrieving of the data words 115(*x*) . . . 115(*y*) also includes retrieving the leading bytes 120(*x*)(0) . . . 120(*x*)(*j*−1), and trailing bytes 120(*y*)(*k*+1) . . . 120(*y*)(*m*). At 215, the DMA controller overwrites (215) the data from the bytes 120(*x*)(0) . . . 120(*x*)(*j*−1), and bytes 120(*y*)(*k*+1) . . . 120(*y*)(*m*) with a pattern. The pattern can comprise all 0's or another pattern indicative of null information.

The DMA controller 125 provides (220) the objects 105, e.g., the contents of the bytes 120(*x*)(*j*) . . . 120(*y*)(*k*) starting at the start address through the end address, prepended with the pattern that overwrites the bytes 120(*x*)(0) . . . 120(*x*) (*j*−1) and appended with the pattern that overwrites bytes 120(*y*) (*k*+1) . . . 120(*y*)(*m*) to the processor 112 via a bus 140.

The foregoing can be used in a variety of applications. For example, in one embodiment, the objects can comprise data structures for compressing video data. Video compression standards such as MPEG-2 use data structures such as macroblocks for compressing video data. During the decoding of compressed video data, a video decoder retrieves macroblocks from memory for decoding.

Figure 3:
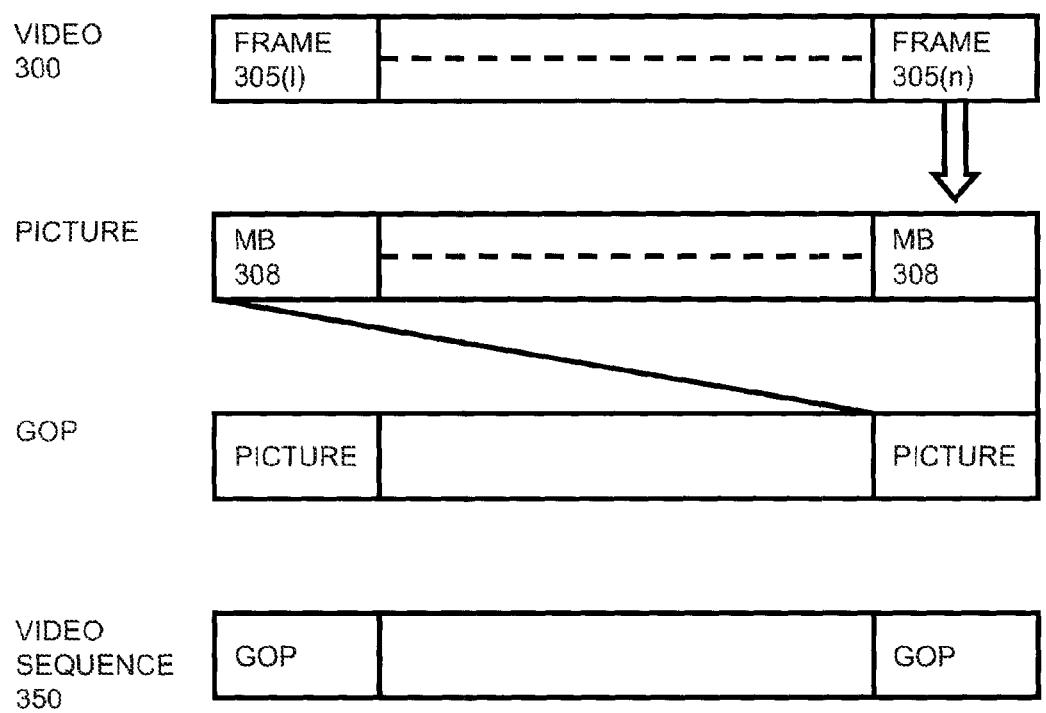
FIG. 3 is a block diagram describing objects for storing and transmitting video data.

Referring now to FIG. 3, there is illustrated a block diagram of video data encoded in accordance with the MPEG-2 standard. The video data comprises a series of frames 305. The frames 305 comprise any number of lines of pixels, wherein each pixel stores a color value.

Pursuant to MPEG-2, the frames 305(1) . . . 305(*n*) are encoded using algorithms taking advantage of both spatial redundancy and/or temporal redundancy. Temporal encoding takes advantage of redundancies between successive frames. A frame can be represented by an offset or a difference frame and/or a displacement with respect to another frame. The encoded frames are known as pictures. Pursuant to MPEG-2, each frame 305(1) . . . 305(*n*) is divided into 16×16 pixel sections, wherein each pixel section is represented by a macroblock 308. A picture comprises the macroblocks 308 representing the 16×16 pixel sections forming the frame 305.

The pictures are further divided into groups known as groups of pictures (GOP). GOPs are further grouped together to form a video sequence 350. The video data 300 is represented by the video sequence 350.

The video sequence 350 can be transmitted to a receiver for decoding and presentation. The data compression achieved allows for transport of the video sequence 350 over conventional communication channels such as cable, satellite, or the internet. Transmission of the video sequence 350 involves packetization and multiplexing layers, resulting in a transport stream, for transport over the communication channel.

Figure 4:
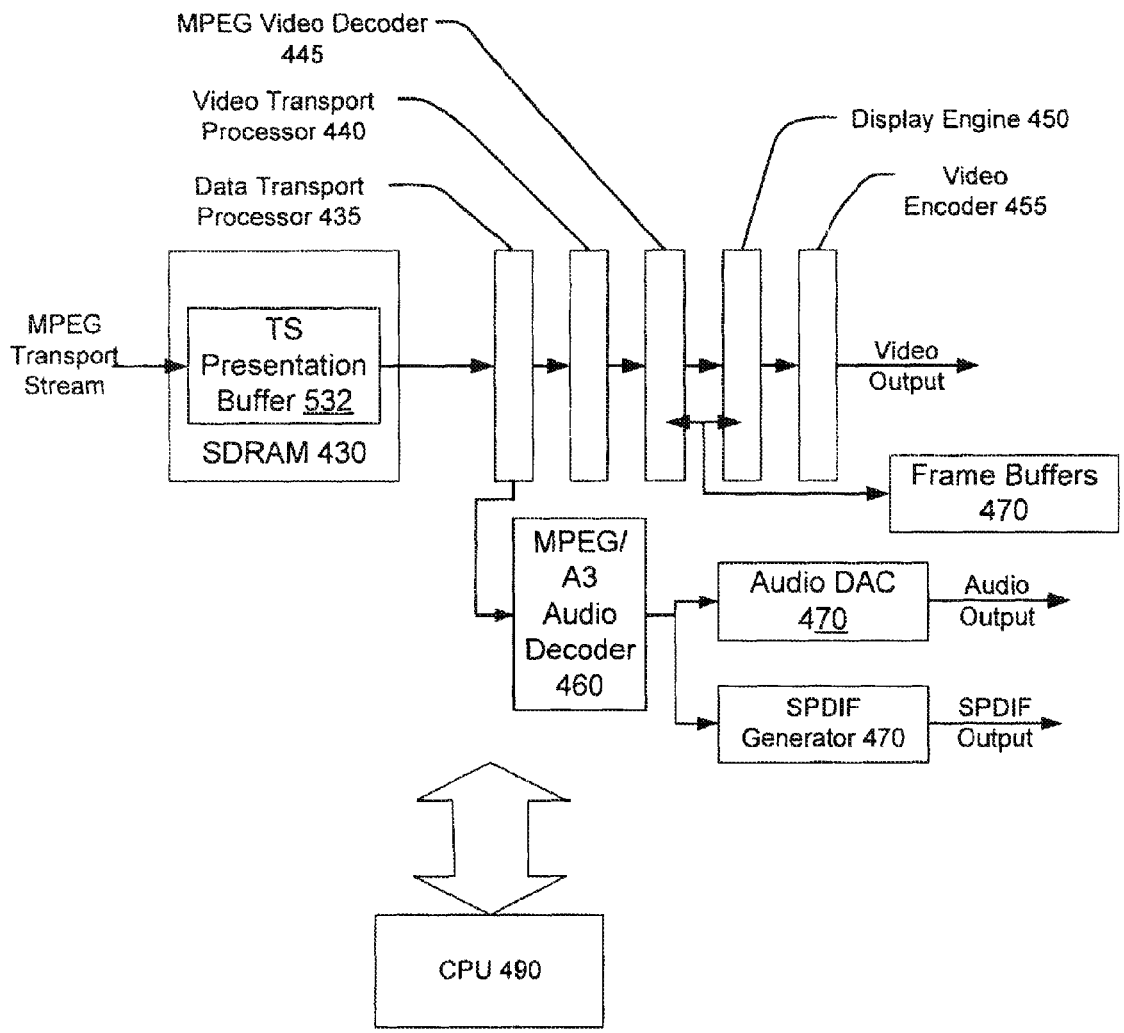
FIG. 4 is a block diagram of an exemplary decoder system in accordance with an embodiment of the present invention.

Referring now to FIG. 4, there is illustrated a block diagram of a decoder system 400, in accordance with an embodiment of the present invention. The video sequences 350 are received and stored in a presentation buffer 432 within SDRAM 430. The data can be received from either a communication channel or from a local memory, such as a hard disc or a DVD, for example.

The data output from the presentation buffer 432 is then passed to a data transport processor 435. The data transport processor 435 demultiplexes the transport stream into packetized elementary stream constituents, and passes the audio transport stream to an audio decoder 460 and the video transport stream to a video transport decoder 440 and then to a MPEG video decoder 445. The audio data is then sent to the output blocks, and the video is sent to a display engine 450.

The display engine 450 scales the video picture, renders the graphics, and constructs the complete display. Once the display is ready to be presented, it is passed to a video encoder 455 where it is converted to analog video using an internal digital to analog converter (DAC). Additionally, the display engine 450 is operable to transmit a signal to the video decoder 445 indicating that certain portions of the displayed frames have been presented for display. The digital audio is converted to analog in an audio digital to analog converter (DAC) 465.

During the decoding process, the SDRAM 432 stores macroblocks 308. The video decoder 445 retrieves the macroblocks 308 from the SDRAM 432 for decoding. The SDRAM 432 comprises gigantic data words that can comprise 16 bytes. The macroblocks 308 are stored with a rounded number of data bytes, but do not necessarily require a rounded number of data words.

Figure 5:
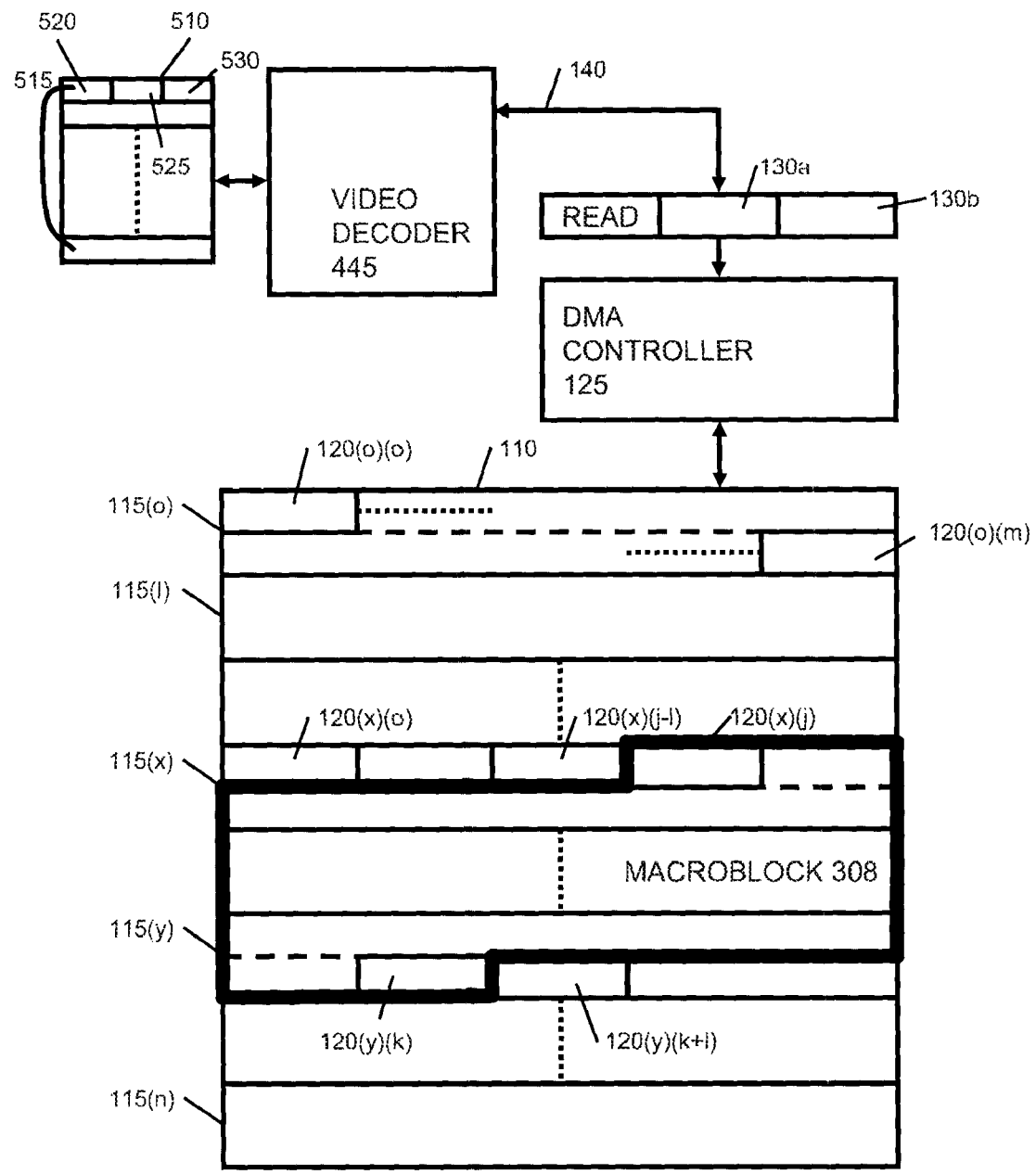
FIG. 5 is a block diagram of a video decoder and SDRAM in accordance with an embodiment of the present invention.

Referring now to FIG. 5, there is illustrated a block diagram describing the SDRAM 432 storing macroblocks 308 and the video decoder 445. The SDRAM 432 comprises any number of data words 115(0) . . . 115(n). Each data words 115(0) . . . 115(n) comprises a plurality of bytes 120(0)(0) . . . 120(n)(m). For example, a word type known as a gigantic word comprises 16 bytes, or 128 bits. Each data word 115 and byte 120 is associated with a particular address. The address of the first byte 120(0)(0) . . . 120(n)(0) of a data word 115(0) . . . 115(n) coincides with the address of the data word.

The data words 115(0) . . . 115(n) are the fundamental storage units within the SDRAM 432. The SDRAM 432 is accessible on a data word 115 by data word basis. Contents form the SDRAM 432 can be selectively accessed, by accessing a contiguous range of memory locations beginning at the start of a data word 115 and terminating at the end of a data word 115.

Access to the SDRAM 432 is provided and controlled by a direct memory access (DMA) controller 125. When the processor 112 seeks to access data from the SDRAM 432, the processor 112 provides the DMA controller 125 with a starting address 130a and an ending address 130b. Responsive thereto, the DMA controller 125 provides the data word 115(x) and the each data word 115(x+1) . . . 115(y-1), thereafter until the data word 115(y) at the ending address 130b.

As noted above, the data words 115 contain a plurality of bytes. Although many objects 105 are stored as a whole number of bytes 120, the objects 105 do not necessarily require a whole number of data words 115 for storage. Therefore, the objects 105 can be stored in a range of continuous bytes 120 that begin and end in the middle of a data word 115.

The video decoder 445 can retrieve the macroblock 308 from the SDRAM 432 by issuing a read command with a start address and an end address. The video decoder 445 accesses a macroblock address table 510 to determine the start address and the end address of a particular macroblock 308. The macroblock address table 510 comprises records 515, each of which are associated with a particular macroblock 308. Each record 515 includes an identifier 520 indicating the macroblock 308 associated therewith, an indicator 525 indicating the start address of the macroblock 308, and an indicator 530 indicating the end address of the macroblock 308. The start address is the address of the first byte 120 where the macroblock 308 is stored, e.g., 120(x)(j), and the end address is the address of the last byte 120 wherein the object is stored, e.g., 120(y)(k).

As noted above, portions of the SDRAM 432 can be accessed starting from the beginning of a data word 115(x) and terminated at the end of a data word 115(y). Accordingly, in order to retrieve an macroblock 308 stored from bytes 120(x)(j) . . . 120(y)(k), the data words 115(x) . . . 115(y) are retrieved from the SDRAM 432. However, although the data words 115(x) . . . 115(y) include the bytes 120(x)(j) . . . 120(y)(k), the data words 115(x) . . . 115(y) also include the bytes 120(x)(0) . . . 120(x)(j-1), and bytes 120(y)(k+1) . . . 120(y)(m) that are not part of the macroblock 308. Providing the bytes 120(x)(0) . . . 120(x) (j-1), and bytes 120(y)(0) . . . 120(y)(k-1) that are not part of the macroblock 308 can result in erroneous operation by the video decoder 445.

To avoid the foregoing erroneous operation, the processor 112 issues a request to read, with the start address of the macroblock 308, byte 120(x)(j) and the end address of the macroblock 308, byte 120(y)(k) to the DMA controller 125. The DMA controller 125 retrieves the data words 115(x) . . . 115(y) that include the bytes 120(x)(j) . . . 120(y)(k) starting at the start address through the end address. The DMA controller 125 can determine the data words 115(x) . . . 115(y) that include the bytes 120(x)(j) . . . 120(y)(k) in one of several ways. In one embodiment, the number of bytes in a data word 115(x) . . . 115(y) are an integer power of two, such as 2, 4, 8, 16, etc. Accordingly, the address of the data word 115 comprising a byte 120 can be determined by truncating a predetermined number of least significant bits of the byte address. In the case where the number of bytes 120 per data word are not an integer power of two, the data words 115 can be determined by performing a simple arithmetic operations.

As noted, retrieving of the data words 115(x) . . . 115(y) also includes retrieving the bytes 120(x)(0) . . . 120(x) (j-1), and bytes 120(y)(k+1) . . . 120(y)(m). The DMA controller 125 overwrites the data from the bytes 120(x)(0) . . . 120(x) (j-1), and bytes 120(y)(k+1) . . . 120(y)(m) with a pattern. The pattern can comprise all 0's or another pattern indicative of null information.

The DMA controller 125 provides the contents of the bytes 120(x)(j) . . . 120(y)(k) starting at the start address through the end address, prepended with the pattern that overwrites the bytes 120(x)(0) . . . 120(x)(j-1) and appended with the pattern that overwrites bytes 120(y)(k+1) . . . 120(y)(m), to the video decoder 445 via a bus 140.

Figure 6:
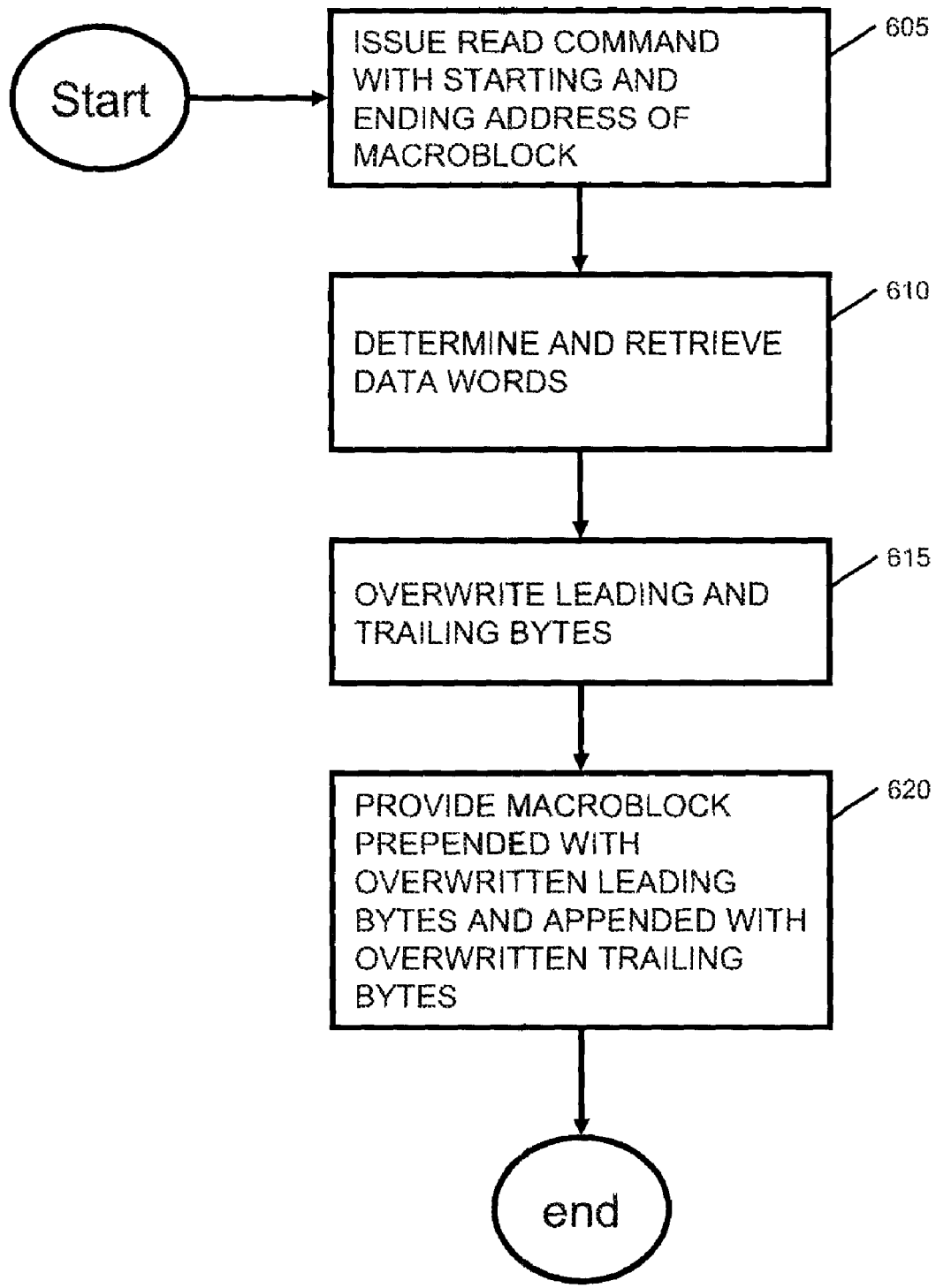
FIG. 6 is a flow diagram for retrieving objects stored in a memory in accordance with the present invention.

Referring now to FIG. 6, there is illustrated a flow diagram for retrieving a macroblock 308 stored in memory 110. At 605, the video decoder 445 issues a read command with the start address of the macroblock 308, byte 120(x)(j), and the end address of the macroblock 308, byte 120(y)(k), to the DMA controller 125 via bus 140. Responsive thereto, the DMA controller 125 determines and retrieves (610) the data words 115(x) . . . 115(y) that include the bytes 120(x)(j) . . . 120(y)(k) starting at the start address through the end address. As noted, retrieving of the data words 115(x) . . . 115(y) also includes retrieving the leading bytes 120(x)(0) . . . 120(x)(j-1), and trailing bytes 120(y)(k+1) . . . 120(y)(m). At 615, the DMA controller overwrites the data from the leading bytes $120(x)(0) \ldots 120(x)(j-1)$, and trailing bytes $120(y)(k+1) \ldots 120(y)(m)$ with a pattern. The pattern can comprise all 0's or another pattern indicative of null information.

The DMA controller 125 provides (620) macroblock 308, e.g., the contents of the bytes $120(x)(j) \ldots 120(y)(k)$ starting at the start address through the end address, prepended with the pattern that overwrites the bytes $120(x)(0) \ldots 120(x)(j-1)$ and appended with the pattern that overwrites bytes $120(y)(k+1) \ldots 120(y)(m)$, to the processor 112 via a bus 140.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for retrieving a macroblock from a memory, said method comprising:
   storing a macroblock in a memory, wherein the memory comprises a transport stream presentation buffer, wherein the memory is communicatively disposed to buffer an MPEG transport stream in the transport stream presentation buffer, wherein a data transport processor is communicatively disposed between the memory and a video transport processor;
   accessing, by a video decoder that is communicatively disposed between a display engine and the video transport processor, a macroblock address table to determine a starting byte address and an ending byte address of a macroblock, wherein the macroblock address table comprises records, wherein each record comprises an identifier associated with the macroblock, a first indicator indicating the starting byte address of the macroblock, and a second indicator indicating the ending byte address of the macroblock;
   determining, by the video decoder, the starting byte address and the ending byte address from the first indicator and the second indicator;
   issuing, by the video decoder, a read command that includes the starting byte address and the ending byte address, the starting byte address being indicative of a starting byte of the macroblock that is stored in the transport stream presentation buffer of the memory; the ending byte address being indicative of the ending byte of the macroblock in the transport stream presentation buffer; the starting byte address, the ending byte address and intermediate byte addresses therebetween being indicative of data bytes of the macroblock; the intermediate byte addresses being indicative of intermediate bytes of the macroblock between the starting byte and the ending byte;
   receiving, by a memory controller, the issued read command, wherein the memory controller receives byte addresses from the video decoder, wherein the memory controller accesses the memory on a word-by-word basis, wherein each word comprises N bytes, wherein N is an integer greater than one and a power of two;
   determining, by the memory controller, a starting data word address and an ending data word address from the starting byte address and the ending byte address, the starting data word address being indicative of a starting data word that includes the starting byte of the macroblock and first bytes that are not part of the macroblock, the first bytes being disposed before the macroblock in the starting data word, the first bytes including first data that cause the video decoder to operate erroneously; the ending data word address being indicative of an ending data word that includes the ending byte of the macroblock and second bytes that are not part of the macroblock, the second bytes being disposed after the macroblock in the ending data word, the second bytes including second data that cause the video decoder to operate erroneously; the starting data word address, the ending data word address and intermediate data word addresses therebetween being indicative of data words of the macroblock, the intermediate data word addresses being indicative of intermediate data words of the macroblock between the starting data word and the ending data word;
   accessing the starting data word, the ending data word and the intermediate data words of the transport stream presentation buffer of the memory;
   overwriting, by the memory controller, the first bytes of the accessed starting data word and second bytes of the accessed ending data word with null information, wherein the null information does not cause the video decoder to operate erroneously; and
   sending, from the memory controller to the video decoder, the macroblock and the null information, wherein the macroblock and the null information comprise the accessed starting data word with the first bytes overwritten by the null information, the accessed ending data word with the second bytes overwritten by the null information and the accessed intermediate data words.

2. The method of claim 1, wherein the memory comprises SDRAM in which resides the transport stream presentation buffer.

3. The method of claim 2, wherein the macroblock is stored in the transport stream presentation buffer in a range of continuous bytes.

4. The method of claim 1, wherein each of the words comprises 16 bytes.

5. The method of claim 1, wherein the starting word address is determined by truncating a predetermined number of least significant bits of the starting byte address.

6. The method of claim 1, wherein the starting word address is determined by performing arithmetic operations on the starting byte address.

7. A system for retrieving a macroblock from a memory, said system comprising:
   a memory in which is stored a macroblock, wherein the memory includes a transport stream presentation buffer, wherein the memory receives an MPEG transport stream and buffers the MPEG transport stream in the transport stream presentation buffer, wherein a data transport processor is communicatively disposed between the memory and a video transport processor;

the video decoder communicatively disposed between a display engine and the video transport processor, wherein the video decoder accesses a macroblock address table to determine a starting byte address and an ending byte address of a macroblock, wherein the macroblock address table comprises records, wherein each record comprises an identifier associated with the macroblock a first indicator indicating the starting byte address of the macroblock and a second indicator indicating the ending byte address of the macroblock wherein the video decoder determines the starting byte address and the ending byte address from the first indicator and the second indicator; and a memory controller operatively coupled to the memory;

wherein the memory controller receives a read request from the video decoder that includes a starting byte address and an ending byte address, the starting byte address being indicative of a starting byte of the macroblock that is stored in the transport stream presentation buffer of the memory; the ending byte address being indicative of the ending byte of the macroblock in the transport stream presentation buffer; the starting byte address, the ending byte address and intermediate byte addresses therebetween being indicative of data bytes of the macroblock; the intermediate byte addresses being indicative of intermediate bytes of the macroblock between the starting byte and the ending byte;

wherein the memory controller receives byte addresses from the video decoder, wherein the memory controller accesses the memory on a word-by-word basis, wherein each word comprises N bytes, wherein N is an integer greater than one and a power of two;

wherein the memory controller determines a starting data word address and an ending data word address from the starting byte address and the ending byte address, the starting data word address being indicative of a starting data word that includes the starting byte of the macroblock and first bytes that are not part of the macroblock, the first bytes being disposed before the macroblock in the starting data word, the first bytes including first data that cause the video decoder to operate erroneously; the ending data word address being indicative of an ending data word that includes the ending byte of the macroblock and second bytes that are not part of the macroblock, the second bytes being disposed after the macroblock in the ending data word, the second bytes including second data that cause the video decoder to operate erroneously; the starting data word address, the ending data word address and intermediate data word addresses therebetween being indicative of data words of the macroblock, the intermediate data word addresses being indicative of intermediate data words of the macroblock between the starting data word and the ending data word;

wherein the memory controller accesses the starting data word, the ending data word and the intermediate data words stored in the transport stream presentation buffer of the memory;

wherein the memory controller overwrites the first bytes of the accessed starting data word, second bytes of the accessed ending data word with null information and none of the bytes of the accessed intermediate data words; and wherein the memory controller outputs, in data word units, the accessed starting data word with the first bytes overwritten by the null information, the accessed ending data word with the second bytes overwritten by the null information, and the accessed intermediate data words with no bytes overwritten by the memory controller.

8. The system of claim 7, wherein the memory comprises SDRAM in which resides the transport stream presentation buffer.

9. The system of claim 7, wherein the macroblock is stored in the transport stream presentation buffer in a contiguous range of memory locations beginning at the starting data word address and ending at the ending data word address.

10. The system of claim 7, wherein each of the words comprises 16 bytes.

11. The system of claim 7, wherein the starting word address is determined by truncating a predetermined number of least significant bits of the starting byte address.

12. The system of claim 7, wherein the starting word address is determined by performing arithmetic operations on the starting byte address.

13. The system of claim 7, wherein the data transport processor demultiplexes the transport stream residing in the transport stream presentation buffer and passes an audio transport stream to an audio decoder and a video transport stream to the video transport decoder and then to the video decoder.

14. A circuit for retrieving a macroblock from a memory, said circuit comprising:

a memory in which is stored a macroblock, wherein the memory includes a transport stream presentation buffer, wherein the memory receives an MPEG transport stream and buffers the MPEG transport stream in the transport stream presentation buffer, wherein a data transport processor is communicatively disposed between the memory and a video transport processor;

the video decoder communicatively disposed between a display engine and the video transport processor, wherein the video decoder accesses a macroblock address table to determine a starting byte address and an ending byte address of a macroblock, wherein the macroblock address table comprises records, wherein each record comprises an identifier associated with the macroblock a first indicator indicating the starting byte address of the macroblock and a second indicator indicating the ending byte address of the macroblock wherein the video decoder determines the starting byte address and the ending byte address from the first indicator and the second indicator; and a direct memory access (DMA) controller operatively coupled to the memory;

wherein the DMA controller receives a read request from the video decoder that includes a starting byte address and an ending byte address, the starting byte address being indicative of a starting byte of the macroblock that is stored in the transport stream presentation buffer of the memory; the ending byte address being indicative of the ending byte of the macroblock in the transport stream presentation buffer; the starting byte address, the ending byte address and intermediate byte addresses therebetween being indicative of data bytes of the macroblock; the intermediate byte addresses being indicative of intermediate bytes of the macroblock between the starting byte and the ending byte;

wherein the DMA controller receives byte addresses from the video decoder, wherein the DMA controller accesses the memory on a word-by-word basis, wherein each word comprises N bytes, wherein N is an integer greater than one;

wherein the DMA controller determines a starting data word address and an ending data word address from the starting byte address and the ending byte address, the starting data word address being indicative of a starting data word that includes the starting byte of the macroblock and first bytes that are not part of the macroblock, the first bytes being disposed before the macroblock in the starting data word, the first bytes including first data that cause the video decoder to operate erroneously; the ending data word address being indicative of an ending data word that includes the ending byte of the macroblock and second bytes that are not part of the macroblock, the second bytes being disposed after the macroblock in the ending data word, the second bytes including second data that cause the video decoder to operate erroneously; the starting data word address, the ending data word address and intermediate data word addresses therebetween being indicative of data words of the macroblock, the intermediate data word addresses being indicative of intermediate data words of the macroblock between the starting data word and the ending data word;

wherein the DMA controller accesses, in data word units, the starting data word, the ending data word and the intermediate data words stored in the transport stream presentation buffer of the memory;

wherein the DMA controller overwrites the first bytes of the accessed starting data word, second bytes of the accessed ending data word with null information and none of the bytes of the accessed intermediate data words; and wherein the DMA controller outputs, in data word units, the accessed starting data word with the first bytes overwritten by the null information, the accessed ending data word with the second bytes overwritten by the null information, and the accessed intermediate data words with no bytes overwritten by the memory controller.

15. The circuit of claim 14, wherein the memory comprises SDRAM in which resides the transport stream presentation buffer.

16. The circuit of claim 14, wherein the macroblock is stored in the transport stream presentation buffer in a contiguous range of memory locations beginning at the starting data word address and ending at the ending data word address.

17. The circuit of claim 14, wherein N is the integer that is not a power of two.

18. The circuit of claim 14, wherein the starting word address is determined by truncating a predetermined number of least significant bits of the starting byte address.

19. The circuit of claim 14, wherein the starting word address is determined by performing arithmetic operations on the starting byte address.

20. The circuit of claim 14, wherein the data transport processor demultiplexes the transport stream residing in the transport stream presentation buffer and passes an audio transport stream to an audio decoder and a video transport stream to the video transport decoder and then to the video decoder.

* * * * *